(12) United States Patent
Park et al.

(10) Patent No.: US 9,296,914 B2
(45) Date of Patent: Mar. 29, 2016

(54) ANTI-FINGER PRINTED HARD COATING RESIN COMPOSITION AND METHOD OF FABRICATING ANTI-FINGER PRINTED HARD COATING FILM USING THE SAME

(71) Applicant: LG Display Co., Ltd., Seoul (KR)

(72) Inventors: Hye-Ran Park, Paju-si (KR); Won-Jin Choi, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/103,477

(22) Filed: Dec. 11, 2013

(65) Prior Publication Data

US 2014/0186542 A1 Jul. 3, 2014

(30) Foreign Application Priority Data

Dec. 27, 2012 (KR) .......................... 10-2012-0155240

(51) Int. Cl.
*C09D 133/14* (2006.01)
*C08K 5/549* (2006.01)

(52) U.S. Cl.
CPC .............. *C09D 133/14* (2013.01); *C08K 5/549* (2013.01)

(58) Field of Classification Search
CPC ........ C09D 133/14; C08K 5/549; C08K 3/36; C08K 5/54; C08L 83/04
USPC ........................................................ 427/515
See application file for complete search history.

(56) References Cited

U.S. PATENT DOCUMENTS

| | | | |
|---|---|---|---|
| 7,632,874 B2 * | 12/2009 | Hayashida et al. | ............. 522/82 |
| 2005/0260414 A1 | 11/2005 | MacQueen | |
| 2008/0075951 A1 * | 3/2008 | Qiu et al. | ....................... 428/336 |
| 2009/0135343 A1 * | 5/2009 | Kitamura et al. | ............... 349/96 |

FOREIGN PATENT DOCUMENTS

| | | |
|---|---|---|
| CN | 101531839 A | 9/2009 |
| CN | 101701129 A | 5/2010 |
| CN | 102504625 A | 6/2012 |

OTHER PUBLICATIONS

State Intellectual Property Office of the People's Republic of China, First Office Action, Chinese Parent Application No. 201310700102.x, Sep. 6, 2015, thirteen pages.

* cited by examiner

*Primary Examiner* — Robert S Walters, Jr.

(74) *Attorney, Agent, or Firm* — Fenwick & West LLP

(57) ABSTRACT

An anti-finger print hard coating resin composition is described that includes a high hardness ultra-violet (UV) curable resin having a weight percent of about 5% to about 99% and including at least one of siloxane compound and urethane acrylate compound; a UV curable fluoro-based compound having a weight percent of about 0.02% to about 2% with respect to the high hardness UV curable resin; an optical initiator having a weight percent of about 0.1% to about 10% with respect to the high hardness-UV curable resin; and an acrylate monomer of residual amount.

4 Claims, 5 Drawing Sheets

| | Compound A (wt%) | Contact angle (in H₂O) | | | | Dyne-pen test | Pencil hardness |
|---|---|---|---|---|---|---|---|
| | | Before test | | After test | | | |
| E1 | 0.4 | 102 |  | 95 |  | #30 | 9H |
| E2 | 0.2 | 112 |  | 102 |  | #30 | 5H |
| CE1 | 3.0 | 99 |  | 60 |  | #30 | 9H |
| | 0.4 | 70 |  | 62 |  | #48 | 9H |
| | 0.2 | 68 |  | 60 |  | #48 | 9H |
| CE2 | 3.0 | 83 |  | 60 |  | #40 | 9H |
| | 0.4 | 72 |  | 62 |  | #48 | 9H |
| | 0.2 | 68 |  | 60 |  | #48 | 9H | ns
ANTI-FINGER PRINTED HARD COATING RESIN COMPOSITION AND METHOD OF FABRICATING ANTI-FINGER PRINTED HARD COATING FILM USING THE SAME

The present application claims the benefit of Korean Patent Application No. 10-2012-0155240 filed in Korea on Dec. 27, 2012, which is herein incorporated by reference.

BACKGROUND OF THE INVENTION

1. Field of the Invention

The present invention disclosure relates to an anti-finger printed hard coating film and more particularly to an anti-finger print hard coating resin composition having advantages in hardness, resistance to showing-fingerprints, and slip properties. The present disclosure further relates to a method of fabricating an anti-finger print hard coating film using the resin composition.

2. Discussion of the Related Art

Fields of display devices have been grown rapidly, and flat display devices such as a liquid crystal displays (LCD) are widely used instead of cathode ray tube (CRT) devices because of their thin profile, light weight and low power consumption.

Recently, a touch type display device, which is driven by user's touch, has been developed. Touch type display devices may be classified into a resistive type and a capacitive type. The outmost layer of the touch type display device is a very important element for the lifetime and the quality of the device. The outermost layer of the touch type display device may be referred to as an anti-finger print hard coating film.

Since the user touches the anti-finger print hard coating film, the anti-finger print hard coating film benefits from high hardness properties. If the hardness of the anti-finger print hard coating film is insufficient, the film is damaged by the user's touch and the lifetime of the device is reduced.

In addition, the anti-finger print hard coating film benefits from resistance to acquiring fingerprints to prevent damage or contamination by the user's fingerprint.

Moreover, the anti-finger print hard coating film benefits from anti-slip properties.

FIGS. 1A and 1B are schematic cross-sectional view showing a fabricating process of the related art of anti-finger print hard coating film.

As shown in FIG. 1A, a hard coating layer 20 is formed on a base substrate 10. The hard coating layer 20 is formed of multi-functional acrylate.

Next, as shown in FIG. 1B, an anti-finger printed layer 30 is formed on the hard coating layer 20 by depositing or coating non-curable fluoro-based compound. As a result, multi-layered type anti-finger print hard coating film is fabricated.

However, when adhesive properties in the multi-layered type anti-finger print hard coating film are insufficient, the layer is peeled or the properties of the anti-finger print hard coating film are deteriorated. In addition, the fabricating process is complicated and production costs are increased because of the two step processes.

On the other hand, a mixture of the material of the hard coating layer 20 and non-curable silicon-based compound may be formed for a single-layered type anti-finger print hard coating film. However, multi-functional acrylate of the hard coating layer 20 and non-curable silicon-based compound do not have chemical linkages such that the non-curable silicon-based compound is floated into and adheres to a surface of the film. As a result, durability of the anti-finger print coating is decreased.

A mixture of the material of the hard coating layer 20 and non-curable fluoro-based compound may be formed for a single-layered type anti-finger print hard coating film. However, chemical compatibility between the materials is such that the layer has insufficient transmissivity. In addition, like the above case, multi-functional acrylate of the hard coating layer 20 and non-curable fluoro-based compound do not have chemical linkages such that the non-curable fluoro-based compound is floated into and adheres to a surface of the film. As a result, durability of the anti-finger print property is decreased.

SUMMARY

Accordingly, embodiments of the present disclosure are directed to an anti-finger print hard coating resin composition and a method of fabricating an anti-finger print hard coating film using the same that substantially overcome one or more of the problems due to limitations and disadvantages of the related art.

An object of the present disclosure is to provide an anti-finger print hard coating resin composition for improving hardness, an anti-finger printed property and a slip property.

Another object of the present disclosure is to provide a method of fabricating an anti-finger print hard coating film with a simplified process and reduced production costs.

Additional features and advantages of the disclosure will be set forth in the description which follows, and in part will be apparent from the description, or may be learned by practice of the disclosure. The objectives and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, the present disclosure provides an anti-finger print hard coating resin composition including a high hardness ultra-violet (UV) curable resin having a weight percent of about 5% to 99% and including at least one of siloxane compound and urethane acrylate compound; a UV curable fluoro-based compound having a weight percent of about 0.02% to 2% with respect to the high hardness UV curable resin; an optical initiator having a weight percent of about 0.1% to about 10% with respect to the high hardness-UV curable resin; and an acrylate monomer of residual amount.

In another aspect of the present disclosure, a method of fabricating an anti-finger print hard coating resin composition that includes a high hardness ultra-violet (UV) curable resin having a weight percent of about 5% to about 99% and including at least one of siloxane compound and urethane acrylate compound, a UV curable fluoro-based compound having a weight percent of about 0.02% to 2% with respect to the high hardness UV curable resin, an optical initiator having a weight percent of about 0.1~10 with respect to the high hardness-UV curable resin and an acrylate monomer of residual amount to form an anti-finger print hard coating resin layer on to a base plate; and irradiating a UV ray to the anti-finger print hard coating resin layer to cure the anti-finger print hard coating resin layer.

It is to be understood that both the foregoing general description and the following detailed description are exemplary and explanatory and are intended to provide further explanation of embodiments as claimed.

BRIEF DESCRIPTION OF THE DRAWINGS

The accompanying drawings, which are included to provide a further understanding of the present disclosure and are

BRIEF DESCRIPTION OF THE DRAWINGS

Figure 1A:
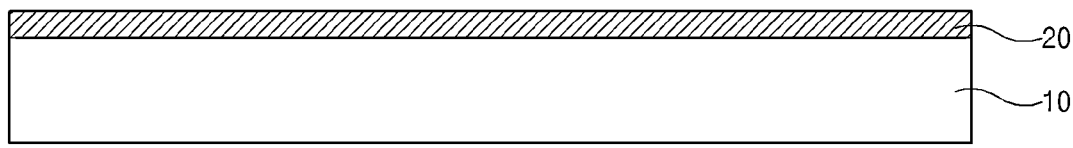
Figure 1B:
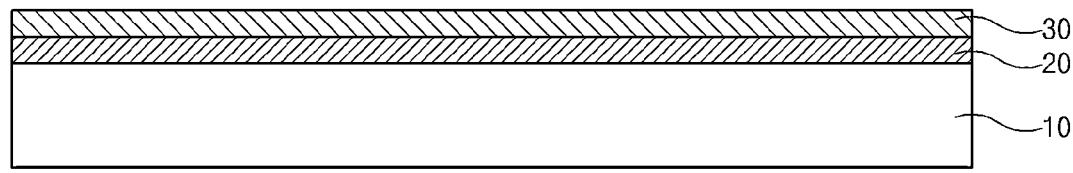

FIGS. 1A and 1B are schematic cross-sectional view showing a fabricating process of the related art anti-finger print hard coating film.

Figure 2A:
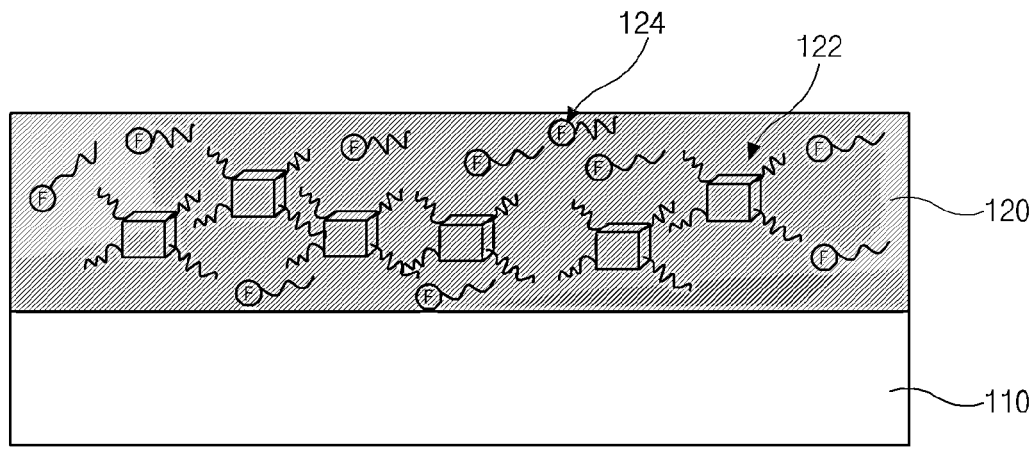
Figure 2B:
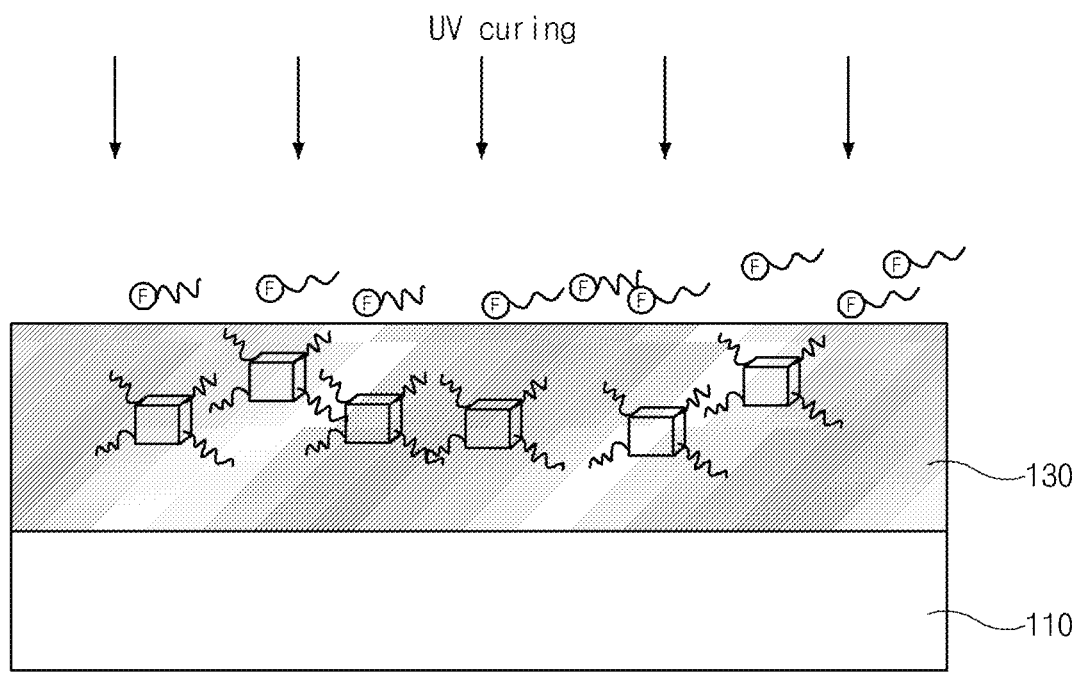

FIGS. 2A and 2B are schematic cross-sectional view showing a fabricating process of an anti-finger print hard coating film according to the present disclosure.

Figure 3A:
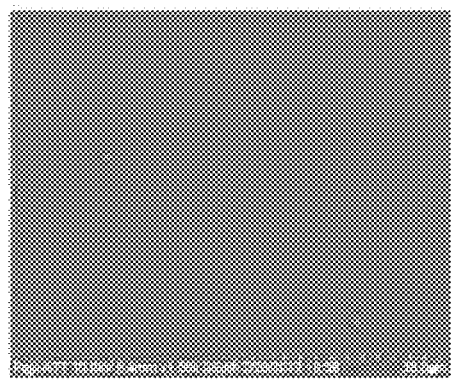
Figure 3B:
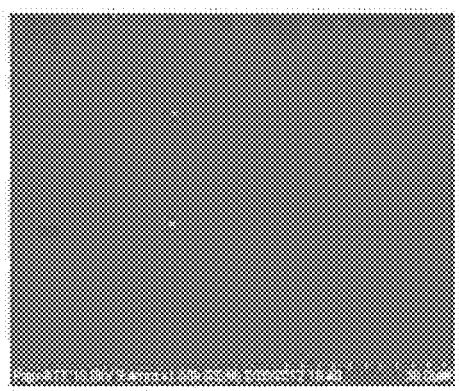

FIGS. 3A and 3B are SEM images of an anti-finger print hard coating film according to the present disclosure before and after an eraser test.

Figure 4A:
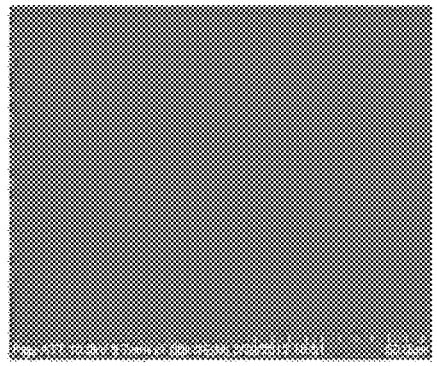
Figure 4B:
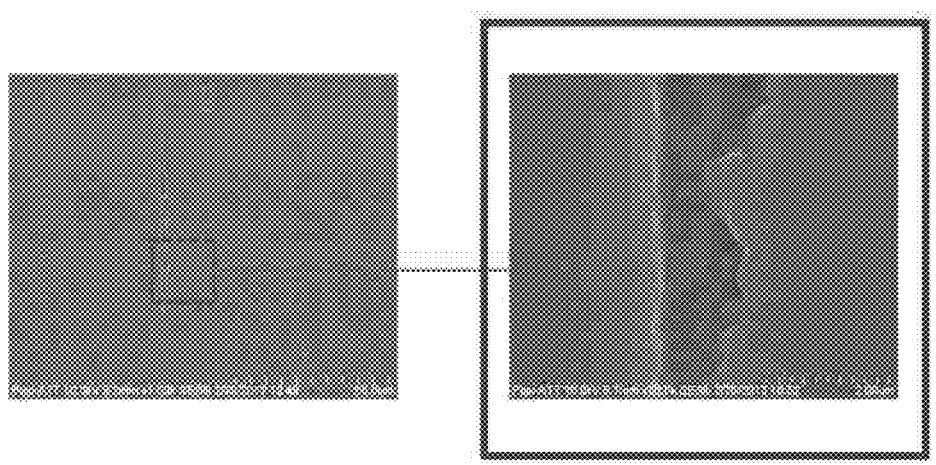

FIGS. 4A and 4B are SEM images of an anti-finger print hard coating film using reactive silicon-based compound before and after an eraser test.

Figure 5:
Figure 5:
Figure 5:
Figure 5:
Figure 5:
Figure 5:
Figure 5:
Figure 5:
Figure 5:
Figure 5:
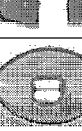
Figure 5:
Figure 5:
Figure 5:
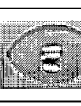
Figure 5:
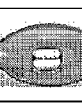
Figure 5:
Figure 5:

FIG. 5 is a view showing Table 1.

DETAILED DESCRIPTION

Reference will now be made in detail to the preferred embodiments, examples of which are illustrated in the accompanying drawings.

An anti-finger print hard coating resin composition of the present disclosure includes a high hardness-UV curable resin and a UV curable fluoro-based acrylate compound in following Formula 1. For example, the high hardness-UV curable resin may includes at least one of a siloxane compound in following Formula 2 and urethane acrylate compound.

In the anti-finger print hard coating resin composition of the present disclosure, the hardness is increased by the high hardness-UV curable resin, and the UV curable fluoro-based acrylate compound and the high hardness-UV curable resin are cured by an optical initiator to form a network structure. Namely, the UV curable fluoro-based acrylate compound is chemically bonded with the high hardness-UV curable resin such that the UV curable fluoro-based acrylate compound remains and maintains their property in an anti-finger print hard coating layer when the user touches the anti-finger print hard coating layer of a touch type display device. As result, degradation of a slip property in the related art is prevented with high hardness and excellent anti-finger print properties.

The anti-finger print hard coating layer has a single-layered structure and includes the high hardness-UV curable resin from at least one of the siloxane compound and the urethane acrylate compound, the UV curable fluoro-based acrylate compound, the optical initiator and aryl monomer.

For example, the anti-finger print hard coating resin composition includes the high hardness-UV curable resin having a weight percent of about 5% to about 99% with respect to the anti-finger print hard coating resin composition, the UV curable fluoro-based acrylate compound having a weight percent of about 0.02% to about 2% with respect to the high hardness-UV curable resin, the optical initiator having a weight percent of about 0.1% to about 10% with respect to the high hardness-UV curable resin, and the acryl monomer of residual amount.

The UV curable fluoro-based acrylate compound for the anti-finger print hard coating resin composition is represented by:

$$Y-(CF_2O)_{m1}(CF_2CF_2O)_{m2}CF_2-Y \quad \text{[Formula 1]}$$

In the Formula 1, "Y" is acrylate, and each of "m1" and "m2" is a positive integer.

In addition, the siloxane compound of the high hardness UV curable resin for the anti-finger print hard coating resin composition is represented by:

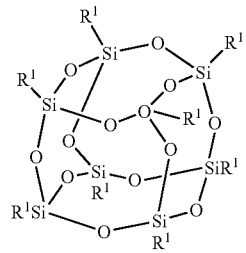

[Formula 2]

In the Formula 2, "R1" may be epoxy acrylate.

The urethane acrylate compound of the high hardness UV curable resin for the anti-finger print hard coating resin composition is represented by:

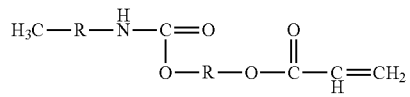

[Formula 3]

In Formula 3, "R" is urethane.

The high hardness UV curable resin in the above Formula 2 or 3 provides sufficient hardness to the anti-finger print hard coating layer. Particularly, the siloxane compound in the above Formula 2 has a relatively low shrinkage (or contraction) ratio due to a steric bulk conformation such that property changes (e.g., shape deformation) of the anti-finger print hard coating layer by outer facts are prevented.

In addition, the UV curable fluoro-based acrylate compound in the Formula 1 is chemically bonded or linked with the high hardness UV curable resin (i.e., the siloxane compound in the Formula 2 and/or the urethane acrylate compound in the Formula 3) such that durability of the anti-finger printed property is improved. Moreover, since the UV curable fluoro-based compound includes less fluorine atom, the compatibility between the UV curable fluoro-based acrylate compound and the high hardness UV curable resin is improved such that transmissivity problem in the related art hard coating layer is prevented.

Furthermore, adhesive strength and coating process of the anti-finger print hard coating resin to a base film is improved.

FIGS. 2A and 2B are schematic cross-sectional view showing a fabricating process of an anti-finger print hard coating film according to the present disclosure.

As shown in FIG. 2A, the anti-finger print hard coating resin composition of the present disclosure is coated to form an anti-finger print hard coating resin composition layer 120 on a base plate (or film) 110. The base plate 110 may be a single-layered plate or a multi-layered plate and formed of at least one polyethyleneterephthalate (PET), polycarbonate (PC) and polymethylmethacrylate (PMMA).

As mentioned above, the anti-finger print hard coating resin composition includes the high hardness-UV curable resin 122 having a weight percent of about 5% to about 99% with respect to the anti-finger print hard coating resin composition, the UV curable fluoro-based acrylate compound 124 having a weight percent of about 0.02% to about 2% with respect to the high hardness-UV curable resin, the optical initiator having a weight percent of about 0.1% to about 10% with respect to the high hardness-UV curable resin and the acryl monomer of residual amount. The anti-finger print hard coating resin composition layer 120 may have a thickness of about 5 μm to about 120 μm.

FIG. 2A shows the siloxane compound in the Formula 2 as the high hardness UV curable resin. However, the urethane compound is used as the high hardness UV curable resin. Alternatively, a mixture of the siloxane compound and the urethane compound can be used as the high hardness UV curable resin.

Next, as shown in FIG. 2B, the anti-finger print hard coating resin composition layer 120 is cured by irradiating the layer with UV radiation. As a result, an anti-finger print hard coating layer 130 is formed on the base plate 110. The laminated base 110 and the anti-finger print hard coating layer 130 is referred to as an anti-finger print hard coating film.

In this instance, the UV irradiation is performed by a medium pressure mercury UV lamp or a metal halide UV lamp under nitrogen gas condition with an intensity of about 500~2000 mJ/cm$^2$. If the intensity of the irradiated light is less than 500 mJ/cm$^2$, a chemical bonding between the high hardness UV curable resin and the UV curable fluoro-base acrylate compound is insufficient such that durability of the anti-finger printed is not secured. In addition, if the intensity of the irradiated light is above than 2000 mJ/cm$^2$, the anti-finger print hard coating layer 120 becomes brittle such that the layer 120 is easily damaged by outer impacts or the user's touch.

As described above, in the present disclosure, the anti-finger printed property is provided on the anti-finger printed hared coating layer 130 by the UV curable fluoro-based acrylate compound. In this instance, the UV curable fluoro-based acrylate compound has excellent compatibility with the high hardness UV curable resin, i.e., siloxane compound and urethane acrylate. As a result, without a problem in transmissivity of the layer 130, a single-layered anti-finger printed hared coating layer 130 can be provided. Accordingly, the anti-finger printed hared coating film of the present disclosure can be fabricated with advantages in the process or production costs in comparison to the related art anti-finger printed hared coating film including the hard coating layer as well as the anti-finger printed layer.

On the other hand, it is experimentally discovered that the UV curable fluoro-based acrylate compound has bad compatibility with another high hardness resin such that a film being formed of a mixture the UV curable fluoro-based acrylate compound and another high hardness resin is inadequate to a display device because of their poor transmissivity.

In addition, when the amount of the UV curable fluoro-based acrylate compound is increased, the compatibility with the high hardness UV curable resin, i.e., the siloxane compound and the urethane compound, is degraded. Referring to the testing results being described below, the weight percent of the UV curable fluoro-based acrylate compound to the high hardness UV curable resin is preferable to be about 0.02% to about 2%, and more beneficially, to be about 0.2% to about 0.4%.

Moreover, the anti-finger print hard coating film of the present disclosure has excellent hardness due to the high hardness UV curable resin. Furthermore, the anti-finger printed property is improved because the UV curable fluoro-based acrylate compound is chemically linked with the high hardness UV curable resin.

The anti-finger print hard coating films respectively formed of the resin composition including the UV curable fluoro-based acrylate compound and siloxane compound (example 1, E1), the UV curable fluoro-based acrylate compound and urethane acrylate compound (example 2, E2), siloxane compound and reactive silicon-based acrylate (comparative example 1, CE1), and siloxane compound and non-reactive silicon-based acrylate (comparative example 1, CE1) are formed, and their properties are tested. The testing results are listed in Table 1.

In the test, the optical initiator and acrylate monomer with the hard coating property compound and the anti-finger printed property compound (A) are used for the anti-finger print hard coating films, and the contact angle property is tested with H$_2$O before and after an eraser test.

As shown in Table 1, the anti-finger print hard coating film of example 1 and example 2 has excellent contact angle in comparison to that of comparative example 1 and comparative example 2. Particularly, decrease of the contact angle of the anti-finger print hard coating film of example 1 and example 2 is relatively small after the test, while decrease of the contact angle of the anti-finger print hard coating film of comparative example 1 and comparative example 2 is relatively large after the test. Namely, the anti-finger print hard coating film of example 1 and example 2 in the present disclosure has excellent anti-finger printed property in comparison to that of comparative example 1 and comparative example 2.

On the other hand, the anti-finger print hard coating film of example 2 has a relatively low pencil hardness. However, it is sufficient to apply the anti-finger print hard coating film into the product (touch type display device).

FIGS. 3A and 3B are SEM images of an anti-finger print hard coating film according to the present disclosure before and after an eraser test. As shown in FIGS. 3A and 3B, surface properties of the anti-finger print hard coating film according to the present disclosure, which includes siloxane compound and UV curable fluoro-based acrylate compound, are scarcely changed after the eraser test.

However, referring to FIGS. 4A and 4B, which are SEM images of an anti-finger print hard coating film using reactive silicon-based compound before and after an eraser hardness test, surface properties of the anti-finger print hard coating film according, which includes siloxane compound and silicon-based compound, are seriously degraded after the eraser test.

Namely, the anti-finger print hard coating film of the present disclosure has excellent anti-finger printed property and hardness property.

It will be apparent to those skilled in the art that various modifications and variations can be made in the present disclosure without departing from the spirit or scope. Thus, it is intended that the present disclosure cover the modifications and variations of this disclosure provided they come within the scope of the appended claims and their equivalents.

What is claimed is:

1. An anti-finger print hard coating resin composition, comprising:
an ultra-violet (UV) curable resin having a weight percent of about 5% to about 99% and including a siloxane compound;
a UV curable fluoro-based acrylate compound having a weight percent of about 0.02% to about 2% with respect to the UV curable resin;
an optical initiator having a weight percent of about 0.1% to about 10% with respect to the UV curable resin; and
an acrylate monomer,
wherein the UV curable fluoro-based acrylate compound is represented by:

and wherein Y is acrylate, and each of m1 and m2 is a positive integer.

2. The composition according to claim 1, wherein the UV curable resin further includes a urethane acrylate compound.

3. A method of fabricating an anti-finger print hard coating resin composition, comprising:
   coating on to a base plate an anti-finger print hard coating resin composition that includes:
      a ultra-violet (UV) curable resin having a weight percent of about 5% to about 99% that includes at least one of a siloxane compound;
      a UV curable fluoro-based compound having a weight percent of about 0.02% to about 2% with respect to the UV curable resin;
      an optical initiator having a weight percent of about 0.1% to about 10% with respect to the UV curable resin; and
      an acrylate; and
   irradiating the anti-finger print hard coating resin layer with UV radiation to cure the anti-finger print hard coating resin layer,
   wherein the UV curable fluoro-based compound is represented by:

$Y-(CF_2O)_{m1}(CF_2CF_2O)_{m2}CF_2-Y$ and wherein Y is acrylate, and each of m1 and m2 is a positive integer.

4. The method according to claim 3, wherein the UV curable resin further includes a urethane acrylate compound.

* * * * *